Sept. 1, 1925.  L. P. HALLADAY  1,552,149
AUTOMOBILE SPRING SUSPENSION
Filed March 17, 1924
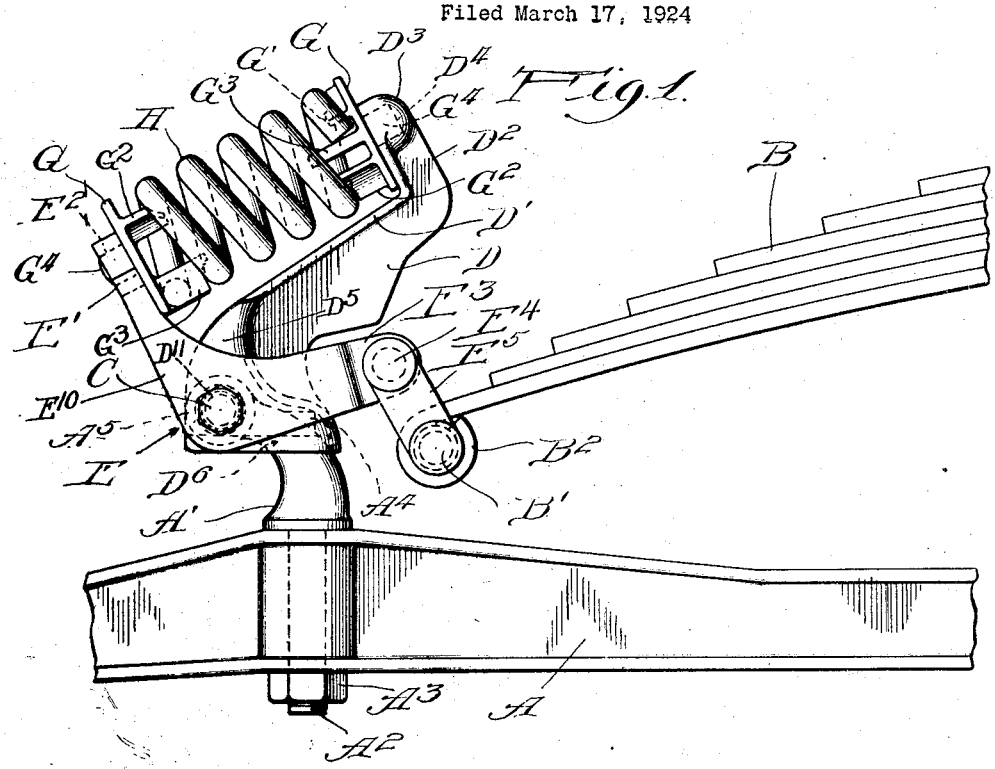
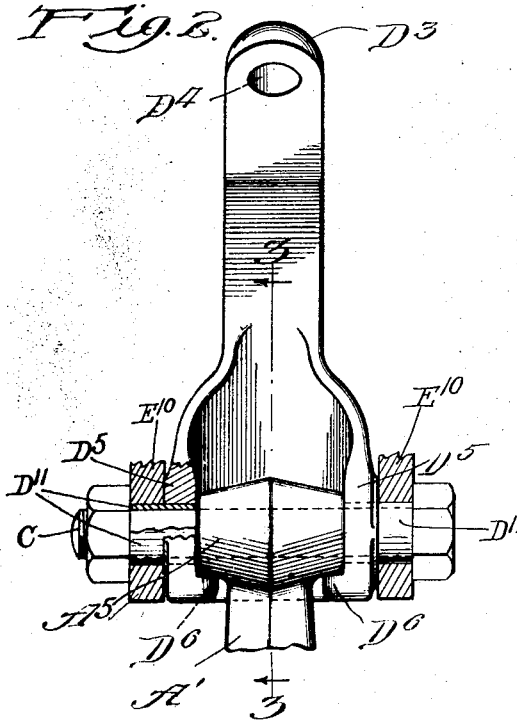
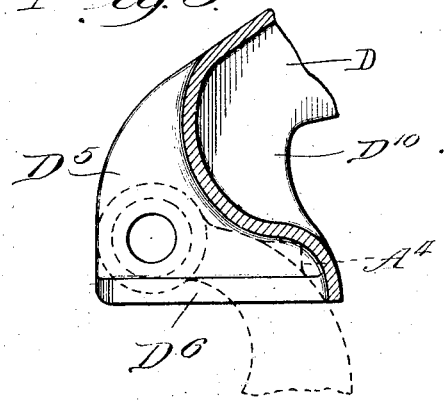
Inventor:
Lewis P. Halladay,
by Parker & Carter
Attys.

Patented Sept. 1, 1925.

1,552,149

UNITED STATES PATENT OFFICE.

LEWIS P. HALLADAY, OF DECATUR, ILLINOIS.

AUTOMOBILE SPRING SUSPENSION.

Application filed March 17, 1924. Serial No. 699,640.

*To all whom it may concern:*

Be it known that I, LEWIS P. HALLADAY, a citizen of the United States, residing at Decatur, in the county of Macon and State of Illinois, have invented a certain new and useful Improvement in Automobile Spring Suspensions, of which the following is a specification.

My invention relates to an improvement in shock absorbers, and particularly to an improvement in spiral spring shock absorbers, which is simple to manufacture, easy to assemble and efficient in operation. Another object is to provide a shock absorber in which the parts shall be of maximum durability. Other objects will appear from time to time in the course of the specification and claims.

I illustrate my invention more or less diagrammatically in the accompanying drawings, wherein—

Figure 1 is a side elevation of the shock absorber in position;

Figure 2 is an end view of the shock absorber with parts omitted; and

Figure 3 is a section on the line 3—3 of Figure 2.

Like parts are illustrated by like characters throughout the specification and drawings.

A is a vehicle axle upon which is mounted the spring perch $A^1$ secured thereto by the bolt $A^2$ and the nut $A^3$. $A^4$ is a lug or stud projecting upwardly and inwardly from the bend of the spring perch $A^1$. It will be noted that in Figure 1 the spring perch is located in a position opposite to that in which it is used when the supplemental spring support is dispensed with.

B is any suitable spring member herein shown as a semi-elliptic spring, the inner end of which is adapted to be secured to the vehicle body, not herein shown.

C is a bolt or pin passing through the eyelet of the perch $A^1$.

Mounted upon the pin C is a spring supporting element which comprises the upwardly and inwardly inclined shank D with the reinforcing flange $D^1$ and the spring engaging portion $D^2$, substantially at right angles thereto and terminating in the relatively hemispherical enlargement $D^3$ which is performed as at $D^4$ to receive the spring engaging element below described. The spring support D is at its opposite end expanded and hollowed to surround the laterally enlarged perforated head $A^5$ of the spring perch $A^1$, and is at that point provided with the opposed perforated walls $D^5$, $D^5$, the inner surfaces of which are spaced apart by substantially the length of the enlargement $A^5$. These walls are strengthened along the bottom by the flange $D^6$ which projects inwardly therealong and is adapted to engage or closely to approach the under side of the enlarged element $A^5$. This flange extends from front to rear of the enlarged portion of the spring support and rests upon the inclined stem of the spring perch $A^1$, the lug $A^4$ supporting the inner surface of the spring support substantially in alignment with the rib $D^{10}$ which contacts the body portion D.

The second or pivoted spring support is in the form of a bell crank lever pivoted as at E upon the pin C, being split at that point to engage such pin at each side of the arms or walls $D^5$ of the fixed spring support D. The two arms join as at $E^1$, the united portion being perforated as at $E^2$ to admit or grip a spring engaging element later to be described. On the opposite side of the pivot E the arms of the lever join as at $E^3$ and are perforated to admit a pivot pin $E^4$ upon which are pivoted the links $E^5$ to the opposite ends of which is secured the pin $B^1$ which passes through the eyelet $B^2$ of the spring B.

Secured to the portions $E^1$ and $D^3$ of the pivoted and fixed spring supports respectively are the spring contacting plates G, each provided with three peripheral radial lugs of varying height $G^1$, $G^2$ and $G^3$, each lug being substantially higher at its inner end than at its outer end. These plates are provided with a centrally located lug or stud $G^4$ adapted to penetrate and seat in the apertures $D^4$ and $E^2$ respectively, being held therein by the tension of the supplemental spring.

H is a spiral spring adapted to be compressed between the opposed plates G. The angular relation of the radial lugs on the plates and the spring is such that the end of the spring abuts against the side of the highest of the three lugs, and is successively contacted by or supported by the lowest lug $G^1$, the intermediate lug $G^2$ and finally by the top of the highest lug $G^3$. The spring may be centered upon these lugs by the shaping of the lugs, they being shaped to conform to the circular cross section of the spring wire, and being herein shown as shaped higher at their inner end than at their outer edges, to have the effect of a core projecting outwardly through the spring and centering it.

For ease in assembly, the fixed spring supporting element D and the bell crank lever are pivoted together for example by the two sleeves $D^{11}$ which pass through the apertures in the perforated walls $D^5$ of the fixed spring supporting element and through the split arms $E^{10}$ of the bell crank lever. The holding pin C is passed through the two sleeves and through the perforated extensions $A^5$ of the perch $A^1$. The result of this is that the spiral spring H may be assembled under compression in the factory. If these sleeves are not used, then in order to assemble the apparatus on a car, it is necessary to provide some kind of a holding tool to compress the spring H so as to permit the operator to fit the parts together with the plates G engaging the spring and with the fixed and rotating spring supports aligned so that the pins C may be pressed through their apertures and through the perforated portion $A^5$ of the spring perch.

It will be realized that while I have shown an operative device, many changes may be made in the size, shape, number, relation, proportion and disposition of parts without departing from the spirit of my invention, and I therefore wish my description and drawings to be taken as in a broad sense diagrammatic.

The use and operation of my invention are as follows:

The shock absorber is assembled with the bell crank lever or moving spring support and the normally fixed spring support both pivoted on the pin C on the perch $A^1$. Compressed between the plates G is the spiral spring H, each end of the spring abutting against the highest of the three lugs on the adjacent plate and supported by the tops of the three lugs of the three lugs and centered on the plate by the upper projection of the inner end of each of the three lugs. The use of these plates and lugs makes unnecessary any flattening or shaping of the end of the spring and makes unnecessary any additional guiding or centering element or mechanism for the spring. The result is a shock absorber of extreme simplicity of manufacture and assembly, and the individual supplemental springs need simply be clipped to the desired length from the spring stock used. The entire supplemental spring action intervenes between the leaf spring and the spring perch. No structural modification is needed to mount the shock absorber means on the vehicle beyond turning the spring perch $A^1$ to the position shown in Figure 1.

The fixed spring support D is held in position by the pressure of the spring which presses it down against the perch $A^1$ and against the lug $A^4$. The bell crank lever or moving support rotates about the pin C and transmits to the spring H the fluctuations in pressure resulting from the unevennesses of the road.

The strengthening flange $D^6$ is so positioned that any play of the element D which would tend to wear out and enlarge or tear out the aperture or eyes in the elements $D^5$ will bring the flange $D^6$ in contact with the elongated element $A^5$ of the spring perch.

The element $D^5$ is, in the course of the use of the vehicle, subjected to strain at two points, namely at the eyelets through its sides, and at its engagement with the spring perch, or rather with the lug $A^4$. The flat portion, or supporting rib $D^{10}$ adequately strengthens the point of engagement with the lug and with the perch and the flanges $D^6$ strengthen the lower edge of the element. At times the fixed spring support will tend to pivot about the lug $A^4$ of the spring perch, exerting an upward strain against the bottom of the pin C and thus tending to enlarge the eyelets. At such time the flanges $D^6$ contact each end of the elongated element $A^5$ and prevent undue strain upon pin and eyelet.

I claim:

1. In a supplemental spring support adapted to be interposed between the running gear and the body of an automotive vehicle, a transverse axle, a spring perch mounted thereon, an elongated, perforated terminal element therefor, a pivot pin passing through said elongated perforated portion, a spring support adapted to be seated upon said perch and to be held in position thereon, in part by said pin, and flanges on said support adapted to engage the bottom of said elongated section.

2. In a supplemental spring support adapted to be interposed between the running gear and the body of an automotive vehicle, a transverse axle, a spring perch mounted thereon, an elongated, perforated terminal element therefor, a pivot pin passing through said elongated perforated portion, an upwardly and inwardly projecting spring support adapted to be seated upon said perch and to be held in position thereon, in part by said pin, the perforated portions thereof being adapted to engage each end of said elongated perforated portion, and flanges inwardly projecting therefrom, adapted to engage the bottoms of the ends of said elongated section.

3. In a supplemental spring support adapted to be interposed between the running gear and the body of an automotive vehicle, a transverse axle, a spring perch mounted thereon, an elongated, perforated terminal element therefor, a pivot pin passing through said elongated perforated portion, a spring support adapted to be seated upon said perch and to be held in position thereon, in part by said pin, and flanges on said support, adapted to engage the bottom of said elongated section, and an opposed pivoted spring support pivoted upon said pivot pin, a spiral spring interposed between one end of said pivoted support and said fixed support, and a connection between the opposite end of said fixed support and the running gear.

4. In a supplemental spring support adapted to be interposed between the running gear and the body of an automotive vehicle, a transverse axle, a spring perch mounted thereon, an elongated, perforated terminal element therefor, a pivot pin passing through said elongated perforated portion, an upwardly and inwardly projecting spring support adapted to be seated upon said perch and to be held in position thereon, in part by said pin, the perforated portions thereof being adapted to engage each end of said elongated perforated portion, and flanges inwardly projecting therefrom, adapted to engage the bottoms of the ends of said elongated section, and an opposed pivoted spring support pivoted upon said pivot pin, a spiral spring interposed between one end of said pivoted support and said fixed support, and a connection between the opposite end of said fixed support and the running gear.

5. In a supplemental spring support adapted to be interposed between the running gear and the body of an automotive vehicle, a transverse axle, a spring perch mounted thereon, a transverse apertured elongated terminal element at the outer end thereof, a spring support carried by the perch, its inner walls being recessed to admit the ends of said terminal element, a pin passing through said aperture and adapted to hold the spring support upon said element, and a supplemental spring adapted to be supported by said spring support.

Signed at Chicago, county of Cook, and State of Illinois, this 8th day of March, 1924.

LEWIS P. HALLADAY.